UNITED STATES PATENT OFFICE.

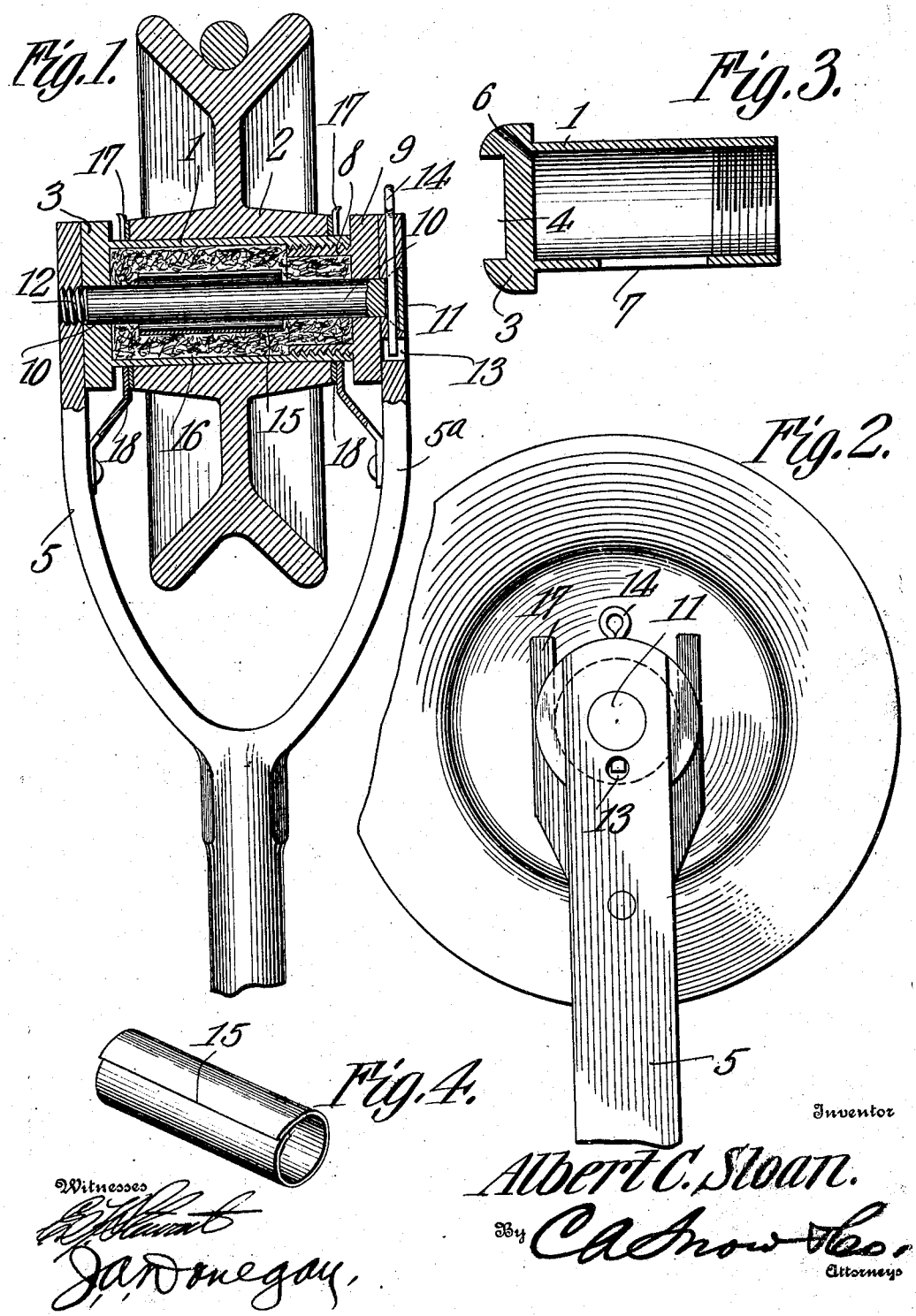

ALBERT C. SLOAN, OF SALAMANCA, NEW YORK.

TROLLEY-WHEEL BEARING.

No. 919,968.

Specification of Letters Patent.

Patented April 27, 1909.

Application filed August 28, 1908. Serial No. 450,734.

*To all whom it may concern:*

Be it known that I, ALBERT C. SLOAN, a citizen of the United States, residing at Salamanca, in the county of Cattaraugus and State of New York, have invented a new and useful Trolley-Wheel Bearing, of which the following is a specification.

This invention relates to lubricating devices for trolley wheels.
It has for its object to provide a device of that kind which will distribute the lubricant evenly and positively to the bearing surface of the wheel.

A further object is to provide a construction which will permit the wheel to have a slight lateral movement over the bearing surface of the shaft.

A still further object is to provide a construction which will tend to force the lubricant from the reservoir.

With these and other objects in view, as will more fully hereinafter appear, the present invention consists in certain novel details of construction and arrangement of parts, hereinafter fully described, illustrated in the accompanying drawings, and more particularly pointed out in the appended claims, it being understood that various changes in the form, proportion, size and minor details of the device may be made without departing from the spirit or sacrificing any of the advantages of the invention.

In the accompanying drawings forming a part of the specification:—Figure 1 is a vertical section of a trolley wheel showing my device applied thereto. Fig. 2 is a side elevation of a trolley wheel and harp showing the method of applying my axle thereto. Fig. 3 is a longitudinal section of the axle. Fig. 4 is a detail perspective of the oil feeding member.

Similar numerals of reference are employed to designate corresponding parts throughout.
The invention consists essentially in a hollow axle designed to be applied to the opposed prongs of a trolley harp, and provided with inlet and outlet openings for the reception and distribution of the lubricating liquid. The axle consists of two sections which will subsequently be termed the reservoir and plug sections; the former, or larger, of these is shown at 1 and consists of a hollow cylindrical member, the length of which is designed to be slightly greater than the length of the hub 2 of the trolley wheel to which it is to be applied. This reservoir member terminates at one end in an enlarged circular head 3, the outer face of which is formed with a vertical recess 4, the width of which is sufficient to straddle one of the forks 5 of the harp. An inlet opening 6 is formed in the head 3 and extends inwardly, terminating at the inner end of the reservoir member 1. The disposition of this opening is such that when the trolley wheel is in engagement with the overhead wire, this opening will, on account of the angle of the pole or harp due to such engagement, extend substantially vertical, thereby preventing the liquid contained within the reservoir from leaking. This construction is well illustrated in Fig. 3. The reservoir is further formed with an elongated opening 7 formed in the wall thereof, and through which the lubricant passes to the bearing surface of the wheel. This opening is disposed substantially at right angles to the vertical recess 4, so that when the harp is vertical and out of engagement with the feed wire, the opening will be substantially horizontal with respect to the vertical plane of the harp. The function of this construction is to prevent the oil from leaving the reservoir when the wheel is out of engagement with the feed wire, as it usually is when the car is in the barn.

The plug section consists of a hollow cylindrical member 8, of less diameter than the member 1, and exteriorly provided with a thread adapted to engage a similar thread formed in the member 1, and at the open end thereof.

The plug member terminates in an enlarged circular head 9, corresponding in diameter to the head 3 and provided, similar to the latter, with a vertical recess adapted to straddle the opposite prong of the harp, as clearly shown in Fig. 2, it being understood that the length of the reservoir and plug sections will be approximately the same as the distance between the opposed outer faces of the harp prongs. Thus it will be seen that I have provided a stationary axle upon which a suitable trolley wheel may rotate.

In order to secure the axle member to the harp, a suitable locking device is employed and in the present instance is shown to consist of a pin 10, provided at one end with a head 11, and at its opposite end with a thread 12. This member is of a length sufficient to extend to the opposed outer faces of the harp prongs and is adapted to enter alining openings, formed in said prongs and similar openings formed in the centers of the heads 3 and 9 of the reservoir and plug sections.

The openings formed in the prongs of the harp for the reception of the opposite ends of the pin 10, are of unequal diameter the smaller being threaded to receive the threaded end of said pin and the larger formed with a beveled wall which is designed to surround the beveled side of the head 11. The latter is provided with a transverse opening which is adapted to be brought to register with a vertical opening formed in the prong of the harp and extending longitudinally from the upper edge of the latter, through the beveled walls of the opening formed for the head 11, and terminating in a horizontal opening 13, formed in the prong 5ª, beneath the beveled opening. Thus it will be seen that when the parts are in position illustrated in Fig. 1, and the opening of the bead 11 brought into register with the vertical opening of the prong, a suitable locking pin 14 of sufficient length may be inserted into the openings and the parts locked as illustrated.

In order that a proper amount of lubricant may be fed to the bearing surface of the wheel through the opening 7, without undue waste, the following feeding device is employed and consists of a member 15, preferably formed from a sheet of spring metal bent to the shape of a circle, with one of its longitudinal sides overlapping the other. This member is adapted to enter the opening of the reservoir 1, and to encircle the supporting pin 10, it being understood that its exterior diameter will be considerably less than the interior diameter of the reservoir, so as to permit a suitable absorbent element 16 to be interposed there between. The latter element may be of any suitable substance such as felt and the like and is designed to fill the entire space within the reservoir between the outer face of the member 15 and inner face of the member 1, and to be packed therein tight enough to slightly contract the diameter of the member 15. Thus it can be seen when this element is saturated with lubricant, the tendency of the member 15 to expand, will be sufficient to force the lubricant through the opening 7 to the bearing surface of the trolley wheel. In order to yieldingly hold the latter in a central position on the lubricating axle suitable springs 17 are employed which are designed to bear against the opposite ends of the hub 2.

The springs are preferably formed from a sheet of spring metal of oblong shape, having their upper ends recessed sufficiently wide to straddle the opposite ends of the reservoir 1 on the inner side of the heads 3 and 9, while a portion adjacent their lower ends is bent to the shape of an obtuse angle and secured to the opposed inner faces of the prongs 5 and 5ª, beneath the openings formed for the reception of the pin 10.

A suitable washer 18 may be interposed between the edges of the hub and inner face of the springs as shown in Fig. 1.

What is claimed is:—

1. The combination with a trolley harp and wheel, of a tubular axle having a head at either end provided with a recess adapted to embrace the arms of said harp, said axle being further provided with an opening disposed at right angles to the said recesses and communicating with the bearing surface of the wheel.

2. The combination with a trolley harp and wheel, of a tubular axle having a reservoir section provided at one end with an enlarged head having a recess adapted to embrace a prong of said harp, and a plug section to fit into said reservoir section provided at one end with an enlarged head having a recess adapted to straddle the other prong of said harp.

3. The combination with a trolley harp and wheel, of a tubular axle having a reservoir section provided at one end with a circular head having a vertical recess adapted to straddle one prong of said harp, and intermediately provided with an outlet opening communicating with the bearing surface of said wheel, a plug section to fit into said reservoir provided at one end with a circular head having a recess adapted to straddle the other prong of said harp.

4. The combination with a trolley harp and wheel, of a tubular axle having a reservoir section adapted to engage one prong of said harp and provided with an outlet opening communicating with the bearing surface of said wheel, a liquid absorbing element within said reservoir, and a resilient tubular element axially mounted in the reservoir section and embedded in said absorbing element and serving to force the contents of the latter through said opening, a plug section to thread into said reservoir section and provided at one end with means to engage the other prong of said harp.

In testimony that I claim the foregoing as my own, I have hereto affixed my signature in the presence of two witnesses.

ALBERT C. SLOAN.

Witnesses:
C. R. McCann,
Chas. J. Hubbell.